(12) United States Patent
Harding

(10) Patent No.: US 6,484,925 B2
(45) Date of Patent: Nov. 26, 2002

(54) METHOD FOR SOLDERING PIPES

(76) Inventor: Gregory L. Harding, P.O. Box 91064, White Mtn. Lake, AZ (US) 85912

( * ) Notice: Subject to any disclaimer, the term of this patent is extended or adjusted under 35 U.S.C. 154(b) by 46 days.

(21) Appl. No.: 09/808,960

(22) Filed: Mar. 16, 2001

(65) Prior Publication Data

US 2002/0130162 A1 Sep. 19, 2002

(51) Int. Cl.[7] .............................................. B23K 31/02
(52) U.S. Cl. ...................... 228/178; 228/119; 228/189
(58) Field of Search ........................... 285/126.1, 129.1, 285/129.2, 133.11; 228/178, 119, 126, 182, 184, 189

(56) References Cited

U.S. PATENT DOCUMENTS

| | | | | |
|---|---|---|---|---|
| 2,050,728 A | * | 8/1936 | Ost | 174/21 R |
| 3,534,986 A | * | 10/1970 | Hartmann et al. | 228/137 |
| 3,889,354 A | * | 6/1975 | Nishi et al. | 285/382.2 |
| 4,681,349 A | * | 7/1987 | Press et al. | 228/214 |
| 4,848,396 A | * | 7/1989 | Sisk | 137/375 |
| 5,152,311 A | * | 10/1992 | McCreary | 137/15.11 |
| 5,299,839 A | * | 4/1994 | Mogavero | 285/110 |
| 6,231,083 B1 | * | 5/2001 | Marandi | 285/125.1 |
| 6,264,833 B1 | * | 7/2001 | Reamsnyder et al. | 210/133 |

* cited by examiner

Primary Examiner—Tom Dunn
Assistant Examiner—Colleen P. Cooke
(74) Attorney, Agent, or Firm—Tod R. Nissle, P.C.

(57) ABSTRACT

A method for soldering pipes configures the pipes being soldered such that water running through the pipes is not permitted to pool in the pipes. The method also configures the pipes to facilitate sealing of the pipes after the soldering is completed.

3 Claims, 1 Drawing Sheet

METHOD FOR SOLDERING PIPES

Figures 1, 2:
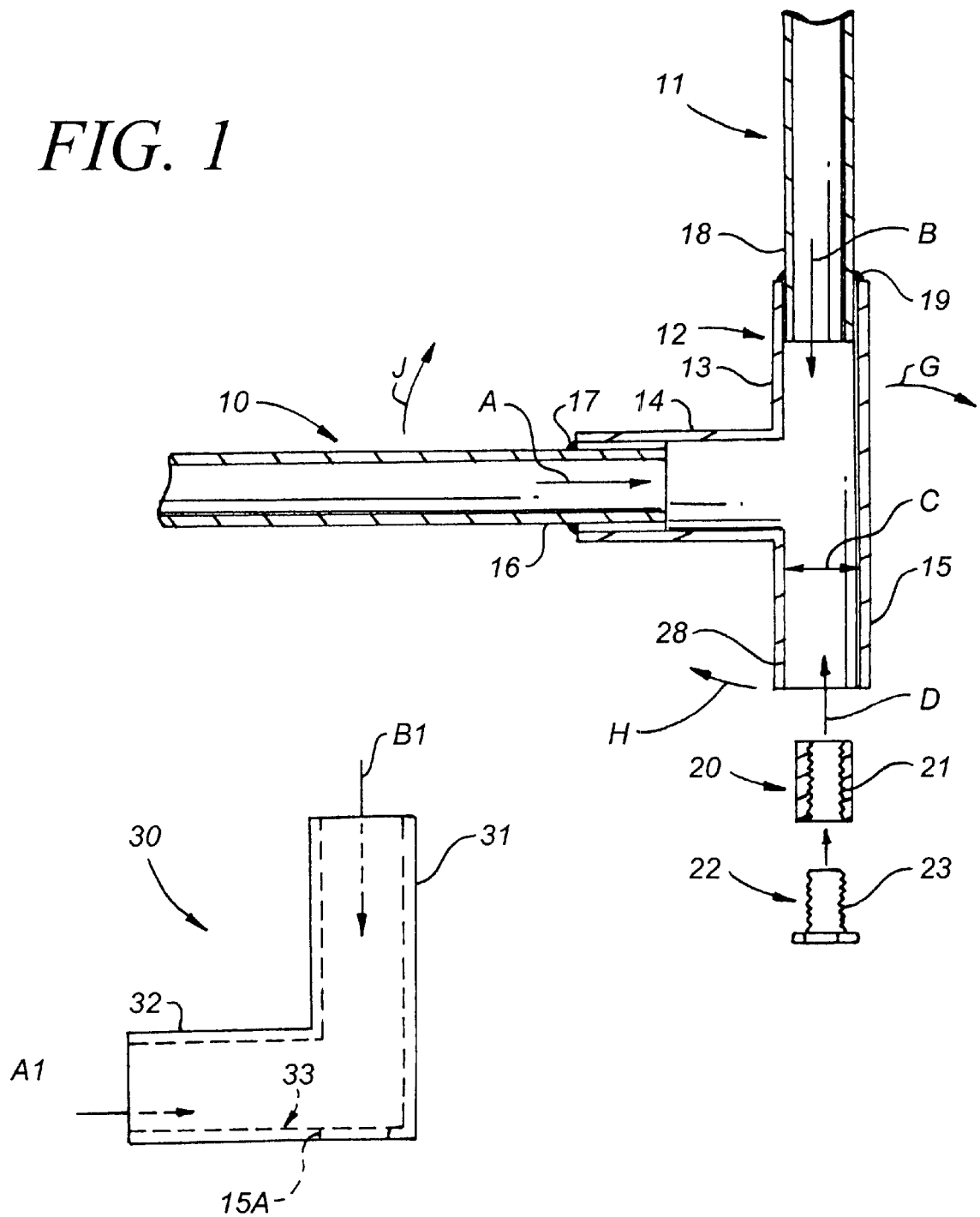

This invention pertains to a method for soldering pipes.

More particularly, this invention pertains to a method for soldering pipes while water is running through the pipes.

Soldering a connector onto a pair of pipes made from copper or another material is a common procedure. The connector functions to form a continuous section of pipe by spanning the distance between the adjacent ends of a pair of copper pipes. When the connector is being soldered onto copper pipes in an existing water system a common problem which is encountered is attempting to solder while water continues to flow out of the existing copper pipes. The water flows through the pipes because of a leak in the water turn-off valve or simply because water continues to drain from the existing water system. The water rapidly draws heat away from the area of copper pipe being soldered, making it difficult to achieve a proper seal with the solder.

Accordingly, it would be highly desirable to provide an improved method for soldering together pieces of pipe while water courses through the pipe.

Therefore, it is a principal object of the invention to provide an improved soldering method.

A further object of the invention is to provide an improved method which permits pipes to be more readily soldered together while water runs through the pipes.

The foregoing and other, further and more specific objects and advantages of the invention will be apparent from the following detailed description of the invention, taken in conjunction with the drawings, in which:

FIG. 1 is perspective view illustrating a soldering method in accordance with the principles of the invention; and, FIG. 2 is perspective view illustrating a conventional connector for copper pipe.

Briefly, in accordance with the invention, I provide an improved method for soldering together at least a first water pipe having a distal end and a second water pipe having a distal end while water flows through at least one of the pipes. The method includes the steps of positioning the distal end of the first water pipe adjacent the distal end of the second water pipe; providing a connector including a first end shaped and dimensioned to be positioned adjacent and soldered to the distal end of the first water pipe, a second end shaped and dimensioned to be positioned adjacent and soldered to the distal end of the second water pipe, a third end, and a control unit for opening and closing the third end; positioning the first end of the connector adjacent the distal end of the first water pipe and positioning the second end of the connector adjacent the distal end of the second water pipe; positioning the third end beneath the first end and the second end such that water running into the connector can flow out under gravity through the third end when open; operating the control unit to open the third end and allow water to flow downwardly under gravity through the third end and out from the connector; soldering the first end of the connector to the distal end of the first pipe; soldering the second end of the connector to the distal end of the second pipe; and, operating the control means to close the third end.

In another embodiment of the invention, I provide an improved method for soldering together at least a first water pipe having a distal end and a second water pipe having a distal end while water flows through at least one of the first water pipe and the second water pipe. The improved method includes the steps of positioning the distal end of the first water pipe adjacent the distal end of the second water pipe; providing a connector including a first end shaped and dimensioned to be positioned adjacent and soldered to the distal end of the first water pipe, a second end shaped and dimensioned to be positioned adjacent and soldered to the distal end of the second water pipe, and a third end; providing a control unit to open and close the third end; mounting the control unit on the third end; positioning the first end of the connector adjacent the distal end of the first water pipe and positioning the second end of the connector adjacent the distal end of the second water pipe; positioning the third end beneath the first end and the second end such that water running into the connector can flow out under gravity through the third end when open; operating the control unit to open the third end and allow water to flow downwardly under gravity through the third end and out from the connector; soldering the first end of the connector to the distal end of the first pipe; soldering the second end of the connector to the distal end of the second pipe; and, operating the control unit to close the third end.

In a further embodiment of the invention, I provide an improved method for soldering together at least a first water pipe having a distal end and a second water pipe having a distal end while water flows through at least said first water pipe, including the steps of positioning the distal end of the first water pipe adjacent the distal end of the second water pipe; providing a connector including a first end shaped and dimensioned to be positioned adjacent and soldered to the distal end of the first water pipe, a second end shaped and dimensioned to be positioned adjacent and soldered to the distal end of the second water pipe, a third end, and a control unit for opening and closing the third end; positioning the first end of the connector adjacent the distal end of the first water pipe; positioning the third end beneath the first end such that water running into the connector can flow out under gravity through the third end when open; operating the control unit to open the third end and allow water to flow downwardly under gravity through the third end and out from the connector; canting the first pipe such that water flows over a first portion of the distal end of the first pipe and into and out of the connector under gravity; soldering the first end of the connector to the first portion of the distal end of the first pipe; and, operating the control unit to close the third end.

Turning now to the drawings, which depict the presently preferred embodiments of the invention for the purpose of illustrating the practice thereof and not by way of limitation of the scope of the invention, FIG. 1 illustrates a pair of hollow copper pipes or conduits 10 and 11 in an existing water supply system for a residence, office building, warehouse, factory, vehicle, or other structure. The shape and dimension of pipes 10, 11 can vary as desired. Pipes 10, 11 can comprise conventional copper pipe, copper tubing, etc. Pipes 10, 11 can be fabricated from any desired material. Vertically oriented pipe 11 includes distal end 18. Horizontally oriented pipe 10 includes distal end 16. Water flows through pipe 11 in the direction indicated by arrow B. Water may also flow through pipe 10 in the direction of arrow A or in a direction opposite that of arrow A. When water pressure into pipes 10, 11 is turned off, water can flow both in the direction of arrow B and of arrow A depending on how water remaining in the water supply system drains through pipes 10 and 11. When water pressure through the water supply system including pipes 10 and 11 is turned off water also often continues to course through pipes 10 and/or 1 1 because the turn off valve leaks and allows some water to flow into the water supply system.

Connector 12 includes a first end 13, second end 14, and portion 15 provided with internal aperture 28. End 13 is shaped and dimensioned to be slid over distal end 18 in the manner shown and to be secured with solder 19 on end 18. End 14 is shaped and dimensioned to be slid over distal end 16 and to be secured with solder 17 on end 16. Member 20 is shaped and dimensioned to be inserted in aperture 28 in the direction of arrow D. Member 20 is fixedly sealingly secured in aperture 28 by soldering, by applying adhesive, or by any other desired means. If desired, instead of using member 20, aperture 28 can be internally threaded to receive directly the external threads 23 of bolt 22.

Member 20 includes internally threaded aperture 21. Bolt 22 includes external threads 23 shaped and dimensioned to be turned into aperture 21 to close and seal aperture 21. If desired, portion 15 can be externally threaded, and bolt 22 can be internally threaded to turn over the external threads of portion 15. Any desired means other than bolt 22 and member 20 can be utilized to seal portion 15 such that it can be opened and closed. For example, a valve can be mounted in or on portion 15.

Connector 30 includes leg 31 shaped and dimensioned to be slid over and soldered to distal end 18. Connector 30 also includes leg 32 shaped and dimensioned to be slid over and soldered to distal end 16. Water can flow into channel 33 in connector 30 in the direction of arrow B1 or can flow intro channel 33 in the direction of arrow A1, depending on the direction of water flow in the water supply system in which connector 30 is integrated.

In use the water flow into pipes 10 and 11 is turned off, or the water flow through pipes 10 and 11 is reduced as much as practical. Connector 30 can be utilized in place of connector 12 to interconnect distal ends 16, 18. When, however, connector 30 is utilized, water tends to pool in connector 30, making it difficult to use solder to affix legs 31 and 32 to ends 18 and 16, respectively.

In use of connector 12 the water flow into pipes 10 and 11 is turned off, or the water flow through pipes 10 and 11 is reduced as much as practical. Solder or any other desired fastening means is utilized to secure member 20 in aperture 28. If bolt 22 is threaded into aperture 21, bolt 22 is removed from aperture 21. End 14 is slid over distal end 16 and end 13 is slid over distal end 18 to position connector 12 as shown in FIG. 1. Portion 15 is positioned such that it is at or beneath the lowest point of ends 13 and 14 such that water traveling into ends 13 and 14 will move into portion 15 and not pool in connector 12. In FIG. 1, end 14 is horizontal and end 13 and portion 15 are vertically oriented. This orientation normally insures that water travels into portion 15. To further insure that water entering ends 16, 18 and connector 12 will flow directly to portion 15, connector 12 (and ends 16, 18) can be at least slightly canted by tilting connector 12 in the directions indicated by arrows G and H. There often is enough play in copper tubing or pipe to tilt connector 12 in this manner after it is positioned on ends 16, 18 in the manner shown in FIG. 1.

Pipe 11 is canted from the horizontal so that water will not pool in end 13. In FIG. 1, pipe 11 is canted at ninety degrees from the horizontal. Canting pipe 11 at only a few degrees from the horizontal is usually sufficient to prevent water from pooling in end 13. Since bolt 22 is removed from aperture 21, water flowing into connector 12 flows downwardly out under gravity in the direction of arrow B through aperture 21. Canting pipe 11 at least a few degrees from the horizontal is particularly desired when portion 15 simply comprises a drain aperture 15A formed in a conventional member 30.

Solder 19 is applied to fasten sealingly ends 13, 18 together. While any desired kind of solder or fastening composition can be utilized, conventional solder which is heated, melted, and applied to copper pipe is presently preferred. Solders used to connect copper tubing sections or to connect other types of material are well known in the art and are not described in detail herein.

After ends 13, 18 are soldered together, horizontally oriented end 16 is slightly tilted upwardly in the direction of arrow J to insure that water will drain from end 16 into portion 15. Ends 16 and 14 are then soldered together.

Once ends 13 and 14 have been soldered to distal ends 18 and 16, respectively, bolt 22 is threaded into aperture 21 to close and seal aperture 21.

The method of the invention functions to permit copper or other conduits to be readily soldered while water continues to run through the conduits.

Having described my invention in such terms as to enable those of skill in the art to make and practice it, and having described the presently preferred embodiments thereof, I claim:

1. A method for soldering together at least a first water pipe having a distal end and a second water pipe having a distal end while water flows through at least one of said first water pipe and said second water pipe, including the steps of
   (a) positioning the distal end of the first water pipe adjacent the distal end of the second water pipe;
   (b) providing a connector including
      (i) a first end shaped and dimensioned to be positioned adjacent and soldered to the distal end of the first water pipe,
      (ii) a second end shaped and dimensioned to be positioned adjacent and soldered to the distal end of the second water pipe,
      (iii) a third end, and
      (iv) control means for opening and closing said third end;
   (c) positioning the first end of the connector adjacent the distal end of the first water pipe and positioning the second end of the connector adjacent the distal end of the second water pipe;
   (d) positioning the third end beneath the first end and the second end such that water running into said connector can flow out under gravity through the third end when open;
   (e) operating said control means to open the third end and allow water to flow downwardly under gravity through the third end and out from said connector;
   (f) soldering the first end of the connector to the distal end of the first pipe;
   (g) soldering the second end of the connector to the distal end of the second pipe; and,
   (h) operating said control means to close the third end.

2. A method for soldering together at least a first water pipe having a distal end and a second water pipe having a distal end while water flows through at least one of said first water pipe and said second water pipe, including the steps of
   (a) positioning the distal end of the first water pipe adjacent the distal end of the second water pipe;
   (b) providing a connector including
      (i) a first end shaped and dimensioned to be positioned adjacent and soldered to the distal end of the first water pipe,
      (ii) a second end shaped and dimensioned to be positioned adjacent and soldered to the distal end of the second water pipe, and
      (iii) a third end,
   (c) providing control means to open and close said third end;

(d) mounting said control means on said third end;
(e) positioning the first end of the connector adjacent the distal end of the first water pipe and positioning the second end of the connector adjacent the distal end of the second water pipe;
(f) positioning the third end beneath the first end and the second end such that water running into said connector can flow out under gravity through the third end when open;
(g) operating said control means to open the third end and allow water to flow downwardly under gravity through the third end and out from said connector;
(h) soldering the first end of the connector to the distal end of the first pipe;
(i) soldering the second end of the connector to the distal end of the second pipe; and,
(j) operating said control means to close the third end.

3. A method for soldering together at least a first water pipe having a distal end and a second water pipe having a distal end while water flows through at least said first water pipe, including the steps of
(a) positioning the distal end of the first water pipe adjacent the distal end of the second water pipe;
(b) providing a connector including
   (i) a first end shaped and dimensioned to be positioned adjacent and soldered to the distal end of the first water pipe,
   (ii) a second end shaped and dimensioned to be positioned adjacent and soldered to the distal end of the second water pipe,
   (iii) a third end, and
   (iv) control means for opening and closing said third end;
(c) positioning the first end of the connector adjacent the distal end of the first water pipe;
(d) positioning the third end beneath the first end such that water running into said connector can flow out under gravity through the third end when open;
(e) operating said control means to open the third end and allow water to flow downwardly under gravity through the third end and out from said connector;
(f) canting said first pipe such that water flows over a first portion of the distal end of the first pipe and into and out of said connector under gravity;
(g) soldering the first end of the connector to said first portion of the distal end of the first pipe; and,
(h) operating said control means to close the third end.

* * * * *